US012493191B2

(12) United States Patent
El-Haddad et al.

(10) Patent No.: US 12,493,191 B2
(45) Date of Patent: Dec. 9, 2025

(54) MULTI-DIRECTIONAL WAVEGUIDE EYE TRACKING SYSTEM

(71) Applicant: Meta Platforms Technologies, LLC, Menlo Park, CA (US)

(72) Inventors: Mohamed Tarek Ahmed El-Haddad, Redmond, WA (US); Yang Yang, Redmond, WA (US); Junjie Hu, Bellevue, WA (US)

(73) Assignee: Meta Platform Technologies, LLC, Menlo Park, CA (US)

( * ) Notice: Subject to any disclaimer, the term of this patent is extended or adjusted under 35 U.S.C. 154(b) by 190 days.

(21) Appl. No.: 18/126,367

(22) Filed: Mar. 24, 2023

(65) Prior Publication Data

US 2024/0319513 A1 Sep. 26, 2024

(51) Int. Cl.
*H04N 23/55* (2023.01)
*G02B 27/01* (2006.01)
*G02B 27/42* (2006.01)
*G06F 3/01* (2006.01)
*G06T 7/70* (2017.01)

(52) U.S. Cl.
CPC ..... *G02B 27/0179* (2013.01); *G02B 27/0172* (2013.01); *G02B 27/4205* (2013.01); *G06F 3/013* (2013.01); *G06T 7/70* (2017.01); *H04N 23/55* (2023.01); *G02B 2027/0178* (2013.01); *G02B 2027/0187* (2013.01)

(58) Field of Classification Search
CPC ................ H04N 23/55; G02B 17/0179; G02B 27/0172; G02B 27/4205; G02B 2027/0178; G02B 2027/0187; G06T 7/70; G06F 3/013

USPC ........................................................... 348/78
See application file for complete search history.

(56) References Cited

U.S. PATENT DOCUMENTS

| 8,638,498 | B2 | 1/2014 | Bohn et al. |
| 9,835,864 | B2 | 12/2017 | Morifuji et al. |
| 10,168,531 | B1 | 1/2019 | Trail et al. |
| 10,302,945 | B2 | 5/2019 | Raffle et al. |
| 10,546,518 | B2 | 1/2020 | Perreault et al. |
| 10,634,907 | B1 * | 4/2020 | Geng ................. G02B 27/0093 |
| 11,143,866 | B2 | 10/2021 | Chi et al. |

(Continued)

FOREIGN PATENT DOCUMENTS

WO 2022120301 A2 6/2022

OTHER PUBLICATIONS

European Search Report for European Patent Application No. 24157637.0, dated Jul. 10, 2024, 05 pages.

*Primary Examiner* — Trang U Tran
(74) *Attorney, Agent, or Firm* — Greenberg Traurig, LLP

(57) ABSTRACT

A lens assembly for a head mounted device may be configured to in-couple light from an eyebox region using a number of waveguide systems coupled to a number of image sensors, for example, for one or both lens assemblies in the head mounted device. The waveguide systems may be positioned in the lens assembly. The waveguide systems may be configured to in-couple light from various portions of the eyebox region. The waveguide systems may be configured to couple the light from a center region of the lens assembly to a number of peripheral regions of the lens assembly. The image sensors may be optically coupled to the waveguide systems and may be configured to receive portions of the light from the waveguide systems.

20 Claims, 9 Drawing Sheets

(56) References Cited

U.S. PATENT DOCUMENTS

| | | | |
|---|---|---|---|
| 11,656,463 B2 * | 5/2023 | Gruhlke | G02B 27/0179 |
| | | | 345/8 |
| 2019/0094551 A1 * | 3/2019 | Yaras | G02B 6/3534 |
| 2019/0101757 A1 | 4/2019 | Martinez et al. | |
| 2021/0011284 A1 | 1/2021 | Andreev et al. | |
| 2022/0128744 A1 * | 4/2022 | Bohn | G02B 27/0172 |
| 2022/0274299 A1 | 9/2022 | Cohen | |
| 2022/0413603 A1 * | 12/2022 | Held | G02B 27/0093 |
| 2023/0205312 A1 * | 6/2023 | Yang | G02B 27/0093 |
| | | | 385/37 |

* cited by examiner

MULTI-DIRECTIONAL WAVEGUIDE EYE TRACKING SYSTEM

TECHNICAL FIELD

This disclosure relates generally to optics and in particular to eye tracking technology.

BACKGROUND INFORMATION

Eye tracking technology enables head mounted displays (HMDs) to interact with users based on the users' eye movement or eye orientation. Existing eye tracking systems can be technically limited by natural obstructions. For example, eyelashes and eyelids can obstruct images taken of an eye, which may decrease the quality of eye tracking operations.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
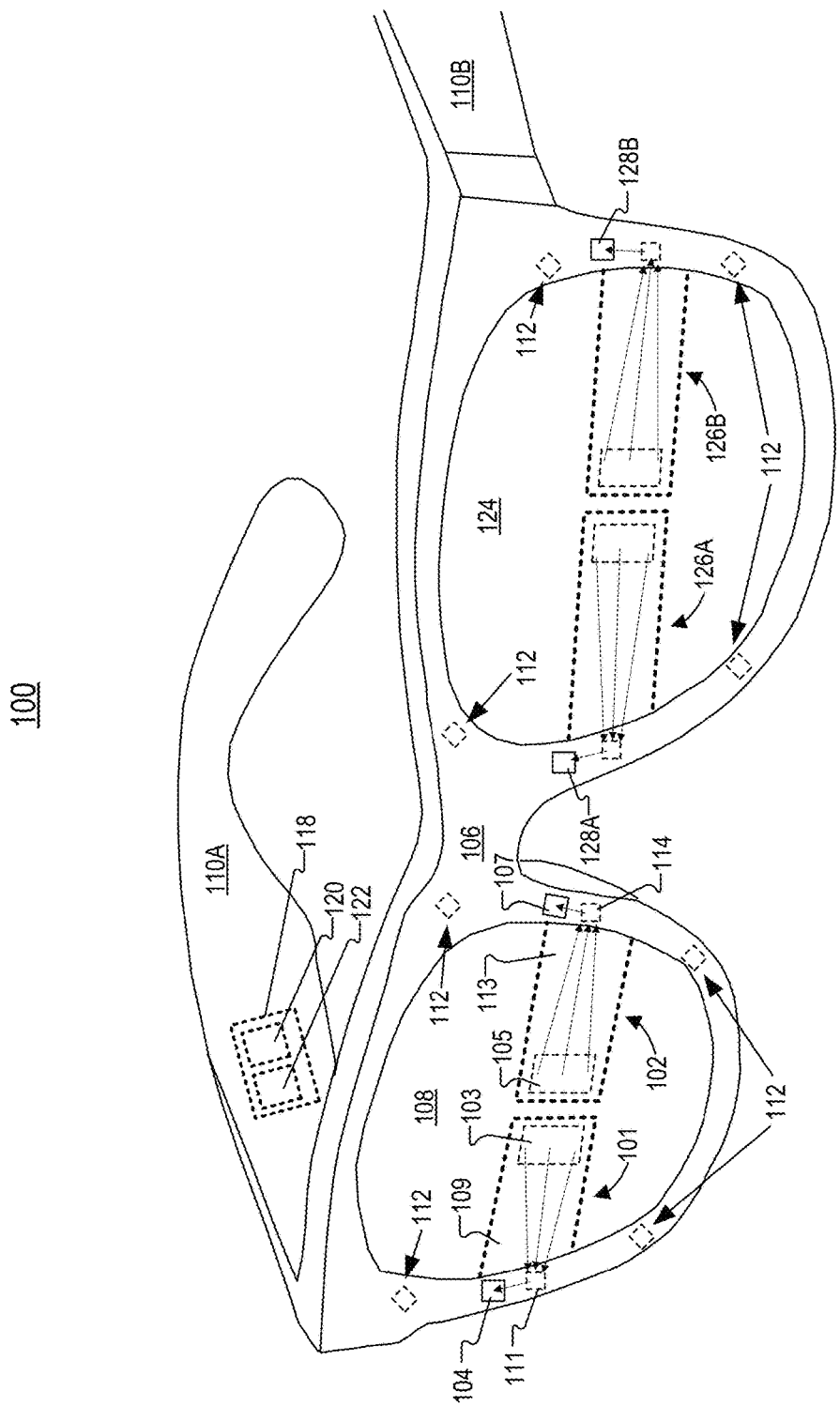
FIG. 1 illustrates a diagram of a head mounted device with a multi-directional waveguide eye tracking system, in accordance with aspects of the disclosure.

Embodiments of a multi-directional waveguide eye tracking system are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In aspects of this disclosure, visible light may be defined as having a wavelength range of approximately 380 nm to 700 nm. Non-visible light may be defined as light having wavelengths that are outside the visible light range, such as ultraviolet light and infrared light. In aspects of this disclosure, red light may be defined as having a wavelength range of approximately 620 to 750 nm, green light may be defined as having a wavelength range of approximately 495 to 570 nm, and blue light may be defined as having a wavelength range of approximately 450 to 495 nm.

As used herein, a diffractive optical element (DOE) may include a holographic grating (e.g., a volume Bragg grating). A holographic grating may include a substrate with a photosensitive material onto which gratings (e.g., grating planes) are recorded (e.g., internal to the substrate). A holographic grating may also be referred to as a holographic optical element (HOE). One type of HOE is a volume Bragg grating (VBG). A DOE may also be referred to as a patch, so embodiments of the disclose may include a multi-patch waveguide system for eye tracking.

Eye tracking functionality expands the services and quality of interaction that head mounted device can provide to users. Eyelashes and eyelids can block and inhibit the quality of signal (e.g., image) available from an eye when imaging is performed from a periphery of an eye. A significantly better position for imaging light reflections from an eye is from directly in front of the eye ("in-field" or "within the field-of-view"). However, placing a camera right in front of an eye could obstruct the vision of a user and could be an annoyance that reduces the quality of a user's experience with the HMD. Disclosed herein are techniques for a waveguide system that captures light from an eye, from in-field of the eye, and from directly in front of an eye. The multi-directional waveguide eye tracking system directs light from an in-field portion of a lens assembly to image sensors that may be positioned on or in a frame of the head mounted device. Additionally, the waveguide system may include one or more waveguide systems that are configured to direct light from an eyebox region to various image sensors, to expand the eyebox region from which reflections can be detected.

A head mounted device may include a multi-directional waveguide eye tracking system that is at least partially disposed in a lens assembly and in a frame of the head mounted device to determine an orientation of a user's eye. The waveguide eye tracking system may direct light reflections (e.g., infrared) from a user's eye to multiple image sensors to enable distraction-free and in-field imaging of a user's eye. The waveguide eye tracking system includes first and second waveguide systems configured to receive light from different portions of an eyebox region and configured to direct light to first and second image sensors. The first waveguide system includes a first waveguide, a first input DOE, and a first output DOE. The first input DOE may be configured to in-couple light from a first portion of an eyebox region and direct the light in a first direction within the first waveguide. The first output DOE may out-couple the light to a first image sensor coupled to a first location of the frame. The second waveguide system includes a second waveguide, a second input DOE, and a second output DOE. The second input DOE may be configured to in-couple light from a second portion of the eyebox region and direct the light in a second direction within the second waveguide. The second output DOE may out-couple the light to a second image sensor coupled to a second location of the frame. The first direction and the second direction may be opposite to one another. In one embodiment, the first and second waveguide systems share a single waveguide that includes two input DOE configured to direct light in the first and second direction. In one embodiment, the first and second waveguide systems share a single waveguide that includes an input DOE configured to direct light in the first and second direction. In one embodiment, a first waveguide includes multiple input DOEs and a second waveguide includes multiple input DOEs, to further increase light detection from the eyebox region. Advantageously, operating the first and second waveguide systems concurrently may enable receipt of light from an area of the eyebox region that is larger than the surface area of the input DOE with the same eye tracking capability. For example, if each input DOE is approximately 7.5 mm by 15 mm, and the input DOE are separated by a 2 mm gap, then the input DOE are receiving light from an area of the eyebox region that spans, for example, 17 mm by 15 mm. Receiving light in this manner may enable improved eye orientation determination, as compared to conventional techniques.

The head mounted device may include processing logic that is coupled to the image sensors and that is configured to determine an orientation of an eye based on the light received from the eyebox region. The processing logic may send control signals to light sources or other actuators based on the estimated or determined orientation of the eye.

The apparatus, system, and method for a multi-directional waveguide eye tracking system described in this disclosure may enable improvements in eye tracking technologies, for example, to support operations of a head mounted device. These and other embodiments are described in more detail in connection with FIGS. 1-5.

FIG. 1 illustrates an example diagram of a head mounted device 100 with a multi-directional waveguide eye tracking system configured to in-couple light from within the field-of-view of an eye of a user, in accordance with aspects of the disclosure. The multi-directional waveguide eye tracking system includes a waveguide system 101 and a waveguide system 102. Waveguide system 101 includes an input DOE 103 configured to in-couple light and direct the light towards an image sensor 104, for example, in a first direction. Waveguide system 102 includes an input DOE 105 configured to in-couple light and direct the light towards an image sensor 107, for example, in a second and opposite direction. Input DOE 103 and 105 may operate together on different portions of an eyebox region to expand an area of the eyebox region from which light may be in-coupled (and imaged), according to an embodiment. Input DOE 103 and 105 may be implemented as one or more of a variety of DOE, such as a volume grating, a volume HOE, or a VBG, for example. A head mounted device, such as head mounted device 100, is one type of smart device. In some contexts, head mounted device 100 is also a head mounted display (HMD) that is configured to provide artificial reality. Artificial reality is a form of reality that has been adjusted in some manner before presentation to the user, which may include, e.g., virtual reality (VR), augmented reality (AR), mixed reality (MR), hybrid reality, or some combination and/or derivative thereof.

Waveguide system 101 includes input DOE 103, a waveguide 109, and an output DOE 111 to support eye tracking functions, in accordance with aspects of the disclosure. Input DOE 103 may in-couple light into waveguide 109 and direct the light into a (first) particular direction towards output DOE 111. Waveguide 109 may optically couple light from input DOE 103 to output DOE 111 using total internal reflection (TIR). Output DOE 111 may out-couple the light from waveguide 109 to image sensor 104.

Image sensor 104 may be coupled to a frame 106 and may be configured to receive light from waveguide system 101. Image sensor 104 may be a complementary metal-oxide-semiconductor (CMOS) image sensor. A bandpass filter may be placed in front of image sensor 104 to filter out unwanted (e.g., visible spectrum) light. Image sensor 104 may be configured to capture images of non-visible (e.g., near infrared) light. Image sensor 104 is configured to capture images of light that is reflected from an eyebox region and onto input DOE 103.

Waveguide system 102 includes input DOE 105, a waveguide 113, and an output DOE 114 to support eye tracking functions, in accordance with aspects of the disclosure. Input DOE 105 may in-couple light into waveguide 113 and direct the light into a (second) particular direction towards output DOE 114, which may be opposite or different than the direction that input DOE 103 directs light. Waveguide 113 may optically couple light from input DOE 105 to output DOE 114 using TIR. Output DOE 114 may out-couple the light from waveguide 113 to image sensor 107. Image sensor 107 may be coupled to frame 106 and may be configured to receive light from waveguide system 102. Image sensor 107 may be configured to operate similarly to image sensor 104 to image a portion of the eyebox region.

Waveguide system 101 and waveguide system 102 are coupled to a lens assembly 108, in accordance with aspects of the disclosure. Lens assembly 108 is coupled or mounted to frame 106, for example, around a periphery of lens assembly 108. Lens assembly 108 may include a prescription optical layer matched to a particular user of head mounted device 100 or may be non-prescription lens. Lens assembly 108 may include a number of optical layers, such as an illumination layer, a display layer (e.g., that includes a display), one or more waveguide layers (e.g., that include waveguide system 101/102), and/or a prescription layer, for example. Frame 106 may be coupled to arms 110A and 110B for securing head mounted device 100 to the head of a user. The illustrated head mounted device 100 is configured to be worn on or about a head of a wearer of head mounted device 100.

Head mounted device 100 includes a number of light sources 112 that are configured to emit light into the eyebox region (e.g., onto an eye), in an embodiment. Light sources 112 may be positioned at one or more of a variety of locations on frame 106 and may be oriented to selectively illuminate the eyebox region with, for example, light that is not in the visible spectrum (e.g., near infrared light). Light sources 112 may include one or more of light emitting diodes (LEDs), photonic integrated circuit (PIC) based illuminators, micro light emitting diode (micro-LED), an edge emitting LED, a superluminescent diode (SLED), or vertical cavity surface emitting lasers (VCSELs).

Head mounted device 100 includes a controller 118 communicatively coupled to image sensors 104 and 107 and light sources 112, according to an embodiment. Controller 118 is configured to control the illumination timing of light sources 112, according to an embodiment. Controller 118 may be configured to synchronize operation of light sources 112 with image sensors 104 and 107 to enable image sensors 104 and 107 to capture reflections of light emitted by light sources 112. Controller 118 is coupled to image sensors 104 and 107 to receive images captured by the image sensors, according to an embodiment. Controller 118 may include processing logic 120 and one or more memories 122 to analyze image data received from image sensors 104 and 107 to: determine an orientation of one or more of a user's eyes, perform one or more eye tracking operations, and/or display or provide user interface elements in lens assembly 108, according to an embodiment. Controller 118 may be configured to provide control signals to the light sources or other actuators (e.g., an in-field display of the lens assembly)

in head mounted device 100 based on the estimated eye orientation. Controller 118 may include a wired and/or wireless data interface for sending and receiving data, one or more graphic processors, and one or more memories 122 for storing data and computer-executable instructions. Controller 118 and/or processing logic 120 may include circuitry, logic, instructions stored in a machine-readable storage medium, ASIC circuitry, FPGA circuitry, and/or one or more processors. In one embodiment, head mounted device 100 may be configured to receive wired power. In one embodiment, head mounted device 100 is configured to be powered by one or more batteries. In one embodiment, head mounted device 100 may be configured to receive wired data including video data via a wired communication channel. In one embodiment, head mounted device 100 is configured to receive wireless data including video data via a wireless communication channel.

Head mounted device 100 may include a lens assembly 124 that includes similar features as lens assembly 108, in accordance with aspects of the disclosure. For example, lens assembly 124 may include waveguide systems 126A and 126B that are configured to in-couple light from an eyebox region (e.g., of a user's left eye) and out-couple the light to image sensors 128A and 128B, for example. Image sensors 128A and 128B may be coupled to controller 118 to provide image data, in support of (left) eye tracking operations, according to an embodiment.

Figure 2:
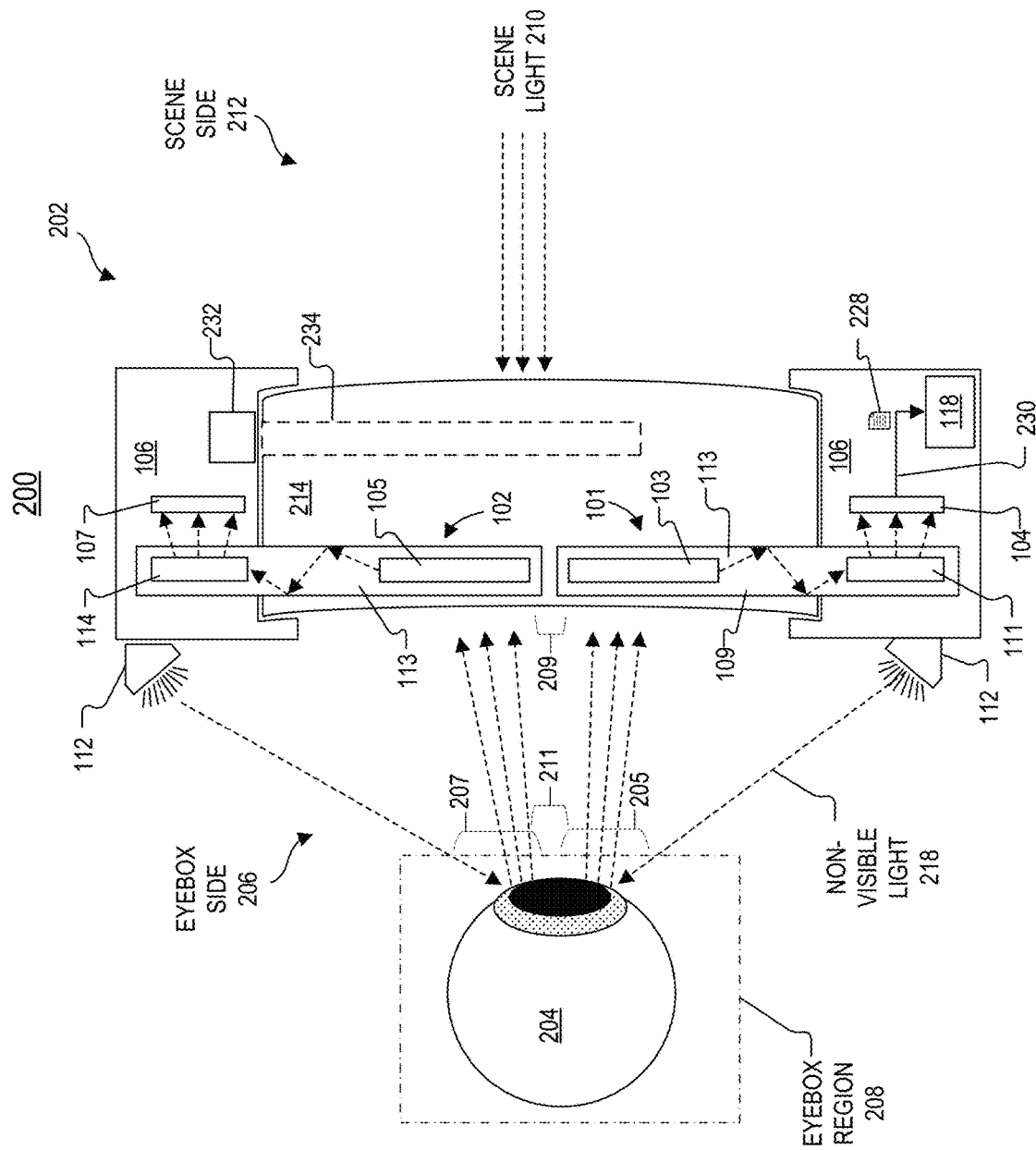
FIG. 2 illustrates a diagram of a top-view of a head mounted device with a multi-directional waveguide eye tracking system, in accordance with aspects of the disclosure.

FIG. 2 illustrates an example top-view of an ocular environment 200, in accordance with various embodiments of the disclosure. Ocular environment 200 includes a head mounted device 202 and an eye 204, according to an embodiment. Head mounted device 202 is an example implementation of head mounted device 100. As illustrated, head mounted device 202 is a partial cross-sectional view of aspects of a head mounted display, according to an embodiment. Eye 204 is positioned on an eyebox side 206 of head mounted device 202. Eye 204 is positioned in an eyebox region 208 on eyebox side 206 and is positioned to receive scene light 210 from a scene side 212. Scene light 210 passes from scene side 212 through lens assembly 214 and through waveguide system 216 to eyebox side 206, to eyebox region 208, and to eye 204, according to an embodiment.

Light sources 112 are configured to emit non-visible light 218 to enable operation of waveguide systems 101 and 102. Waveguide system 101 may be configured to in-couple light from a first portion 205 of eyebox region 208, and waveguide system 102 may be configured to in-couple light from a second portion 207 of eyebox region 208 to cover a greater area of eyebox region 208 than a single input DOE may be capable of operating on. To in-couple different portions of eyebox region 208, waveguide systems 101 and 102 may be separated by a gap 209, which may correspond with a gap 211 that may separate first portion 205 from second portion 207 of eyebox region 208, according to an embodiment. As illustrated, input DOE 103 and 105 may be configured to in-couple non-visible light 218 at angles within waveguides 109 and 113, respectively, to enable TIR propagation to output DOE 111 and 114.

A portion of waveguide systems 101 and 102 may extend into frame 106, in accordance with aspects of the disclosure. For example, waveguide 109 may extend into frame 106 to enable output DOE 111 to be enclosed in frame 106 and to enable output DOE 111 to be optically coupled to image sensor 104. Image sensor 104 may be partially or fully enclosed in frame 106. Similarly, waveguide 113 may extend into frame 106 to enable output DOE 114 to be enclosed in frame 106 and to enable output DOE 114 to be optically coupled to image sensor 107. Image sensor 107 may be partially or fully enclosed in frame 106. Image data 228 may be read from the image sensors using a communication channel 230, for example.

Head mounted device 202 may include a projector 232 and a display 234 that are configured to provide information and/or user interface elements to eyebox region 208 for viewing by a user of head mounted device 202, according to an embodiment. Display 234 may include a liquid crystal display (LCD), an organic light emitting diode (OLED) display, micro-LED display, quantum dot display, pico-projector, or liquid crystal on silicon (LCOS) display for directing image light to a wearer of head mounted device 202. Projector 232 may be positioned in or on frame 106, and display 234 may be at least partially positioned within lens assembly 214, according to an embodiment. Display 234 may be transparent and may be configured to allow scene light 210 to pass through lens assembly 214 to eyebox region 208, according to an embodiment. Projector 232 and display 234 may be communicatively coupled to receive instructions and/or information from controller 118 and may be configured to project information at least partially based on an orientation of eye 204, according to an embodiment.

Lens assembly 214 is illustrated as a single optical layer for illustrative purposes. Lens assembly 214 may be implemented as a single optical layer, as illustrated, or may be implemented as two or more optical layers coupled together to include waveguide systems 101 and 102 and display 234, according to an embodiment.

Figure 3A:
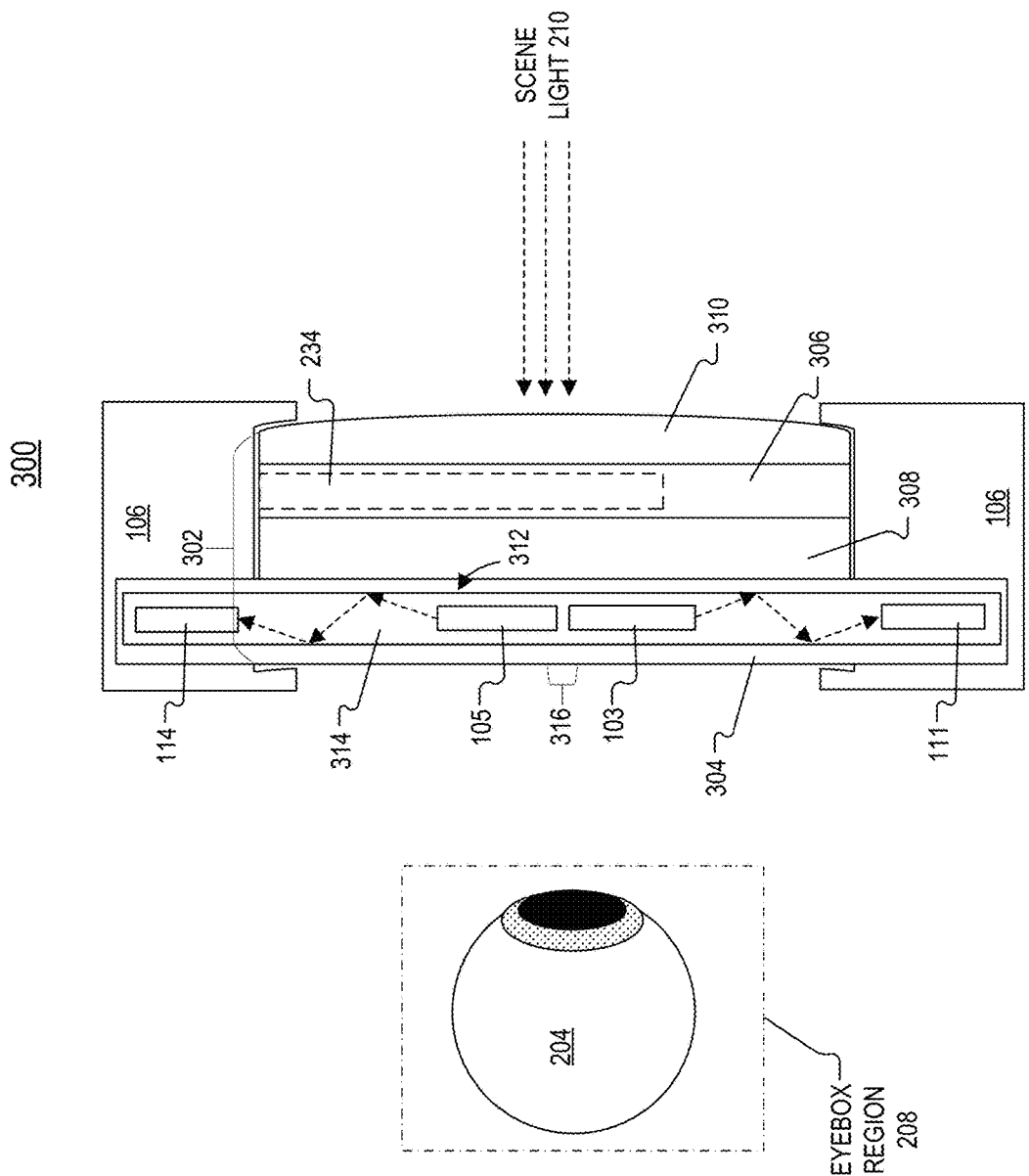
FIGS. 3A, 3B, 3C, and 3D illustrate diagrams various implementations of a multi-directional waveguide eye tracking system, in accordance with aspects of the disclosure.

FIGS. 3A, 3B, 3C, and 3D illustrate diagrams various implementations of a multi-directional waveguide eye tracking system, in accordance with aspects of the disclosure. FIG. 3A illustrates a top view of a head mounted device 300, according to an embodiment. Head mounted device 300 is an implementation of head mounted device 100 or 202, in accordance with aspects of the disclosure. Head mounted device 300 includes a lens assembly 302 that includes a number of optical layers, according to an embodiment. Lens assembly 302 is an example implementation of lens assembly 214, according to an embodiment. Lens assembly 302 includes a waveguide optical layer 304 and a display optical layer 306, according to an embodiment. Waveguide optical layer 304 is coupled to display optical layer 306 to transmit scene light 210 to eyebox region 208, according to an embodiment. Lens assembly 302 may include one or more additional layers, such as optical layer 308 and optical layer 310 to provide optical power, spacing, and one or more additional features or characteristics to support operation of head mounted device 300, according to an embodiment.

Head mounted device 300 may include a multi-directional waveguide system 312 that includes a waveguide 314, input DOE 103 and 105, and output DOE 111 and 114. Input DOE 103 and 105 are configured to direct light in opposite directions towards opposite ends of a waveguide 314, according to an embodiment. Input DOE 103 and 105 may include a gap 316 to input light from different and separated portions of eyebox region 208. Waveguide 314 may extend into frame 106 in two places to align output DOE 111 and 114 with image sensors. In accordance with aspects of the disclosure, a second waveguide with multiple input DOEs may be included in, for example, optical layer 308 to further increase light detection from eyebox region 208.

Figure 3B:
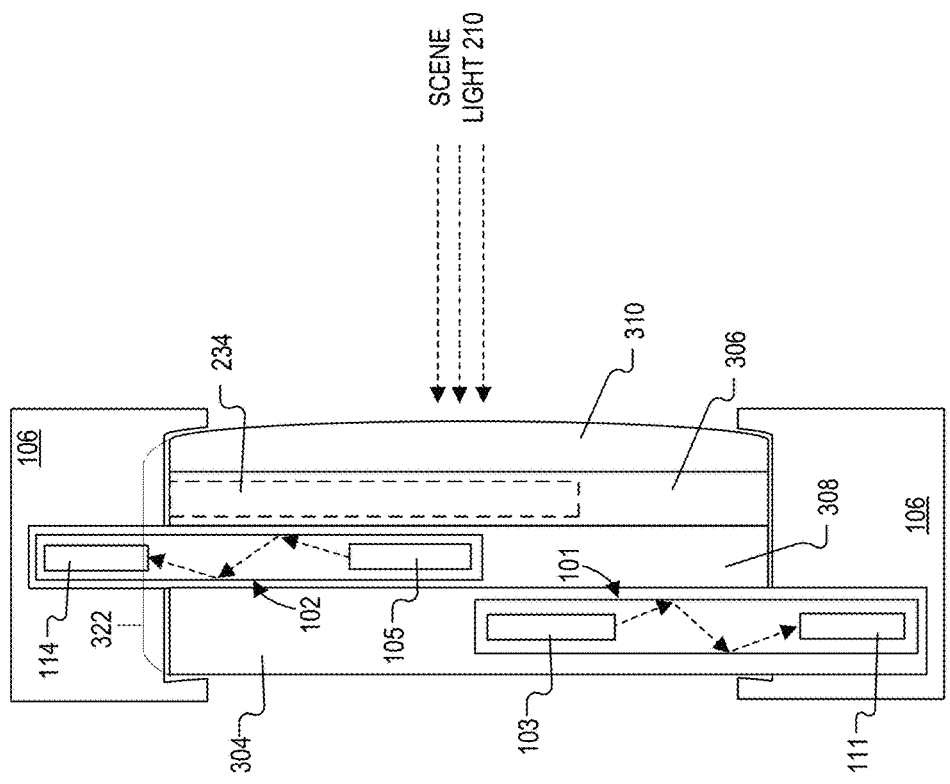
Figure 3B:
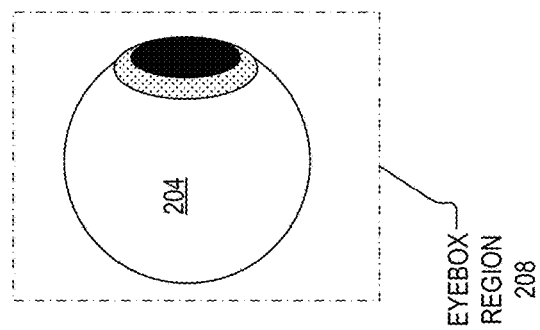

FIG. 3B illustrates a top view of a head mounted device 320, according to an embodiment. Head mounted device 320 is an implementation of head mounted device 100 or 202, in accordance with aspects of the disclosure. Head mounted device 320 includes a lens assembly 322 that includes waveguide system 101 in waveguide optical layer 304 and that includes waveguide system 102 in optical layer 308, according to an embodiment. In other words, waveguide systems 101 and 102 may be implemented in different optical layers of lens assembly 322, to direct light towards different locations of frame 106, according to an embodiment.

Figure 3C:
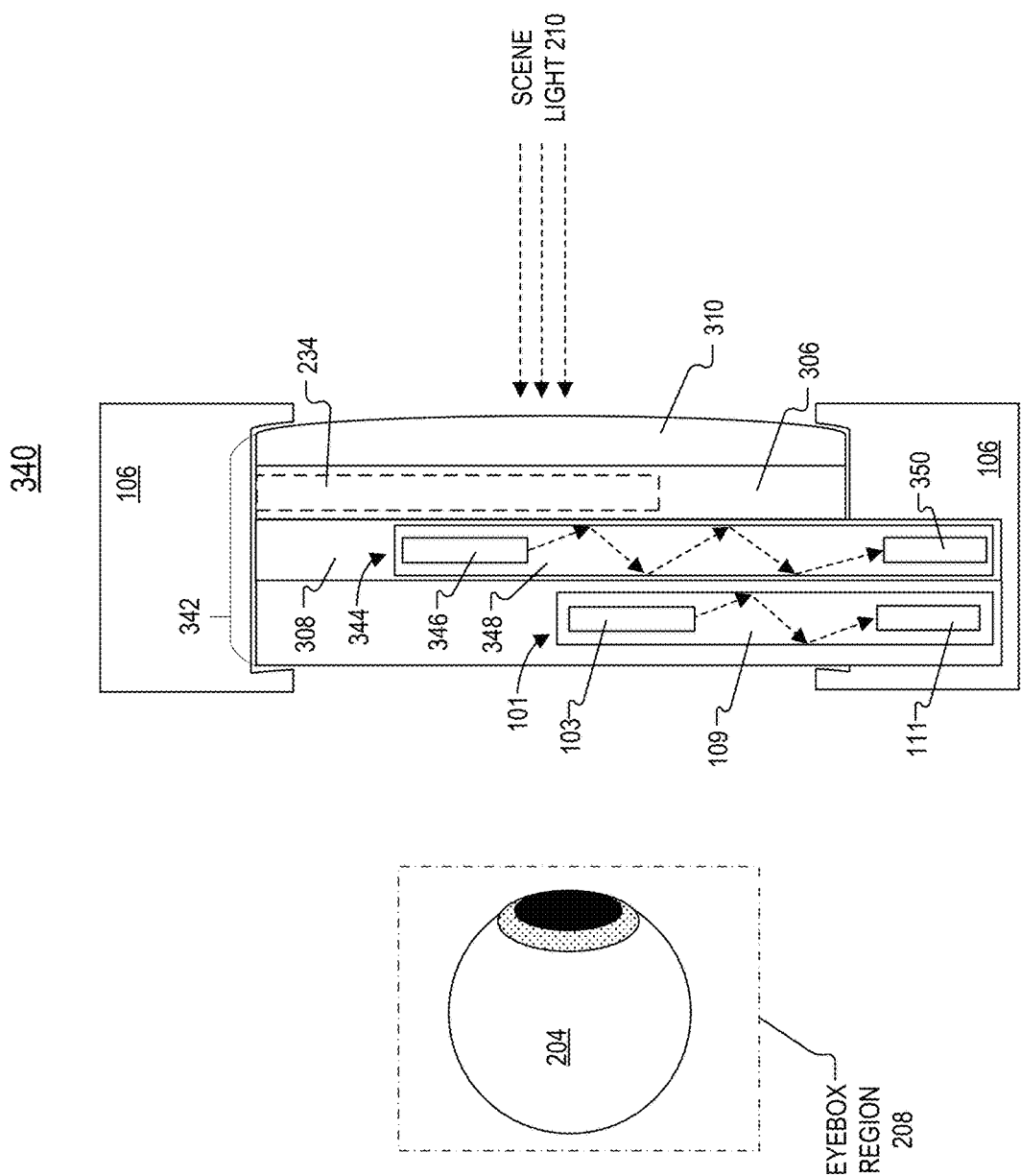

FIG. 3C illustrates a top view of a head mounted device 340, according to an embodiment. Head mounted device 340 is an implementation of head mounted device 100 or 202, in accordance with aspects of the disclosure. Head mounted device 340 includes a lens assembly 342 that includes waveguide system 101 in waveguide optical layer 304 and that includes waveguide system 344 in optical layer 308, according to an embodiment. Waveguide system 344 includes an input DOE 346 within a waveguide 348 and is configured to direct light towards output DOE 350, according to an embodiment. Input DOE 346 may be configured to direct light in the same direction as input DOE 103. However, input DOE 346 may be offset from input DOE 103, so as to capture light from different portions of eyebox region 208 and from a greater area of eyebox region 208 than a single DOE may cover, according to an embodiment.

Figure 3D:
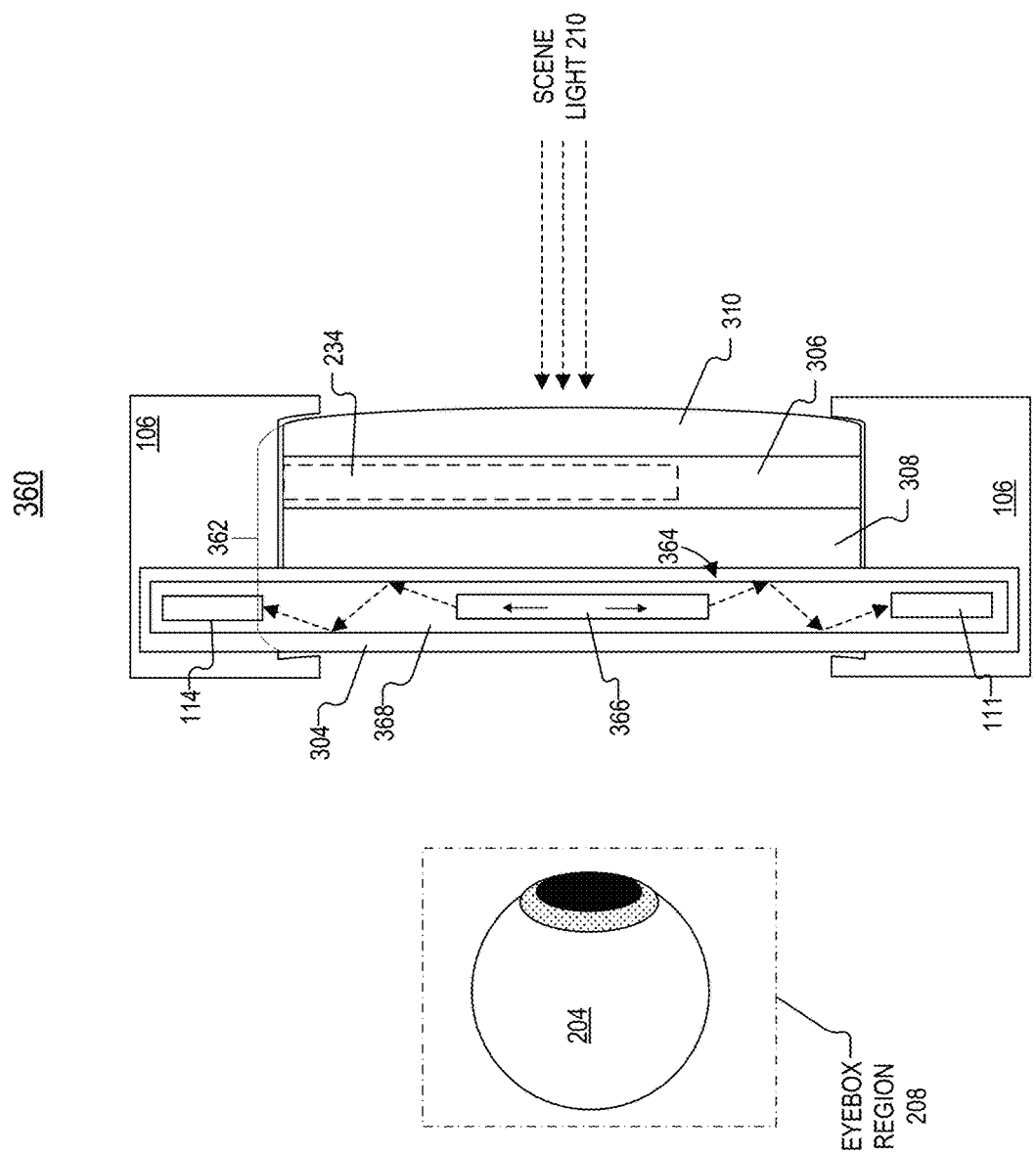

FIG. 3D illustrates a top view of a head mounted device 360, according to an embodiment. Head mounted device 360 is an implementation of head mounted device 100 or 202, in accordance with aspects of the disclosure. Head mounted device 360 includes a lens assembly 362, which includes a waveguide system 364 that is configured to in-couple light from an eyebox region and direct the light into different directions, according to an embodiment. Waveguide system 364 includes an input DOE 366 in a waveguide 368 that is positioned in waveguide optical layer 304. Input DOE 366 may be a VBG having half of the gratings configured to direct light in one direction and having the other half of the gratings configured to direct light in another (opposite) direction. In accordance with aspects of the disclosure, a second waveguide with a second multi-directional input DOE may be included in, for example, optical layer 308 to further increase light detection from eyebox region 208.

Figure 4A:
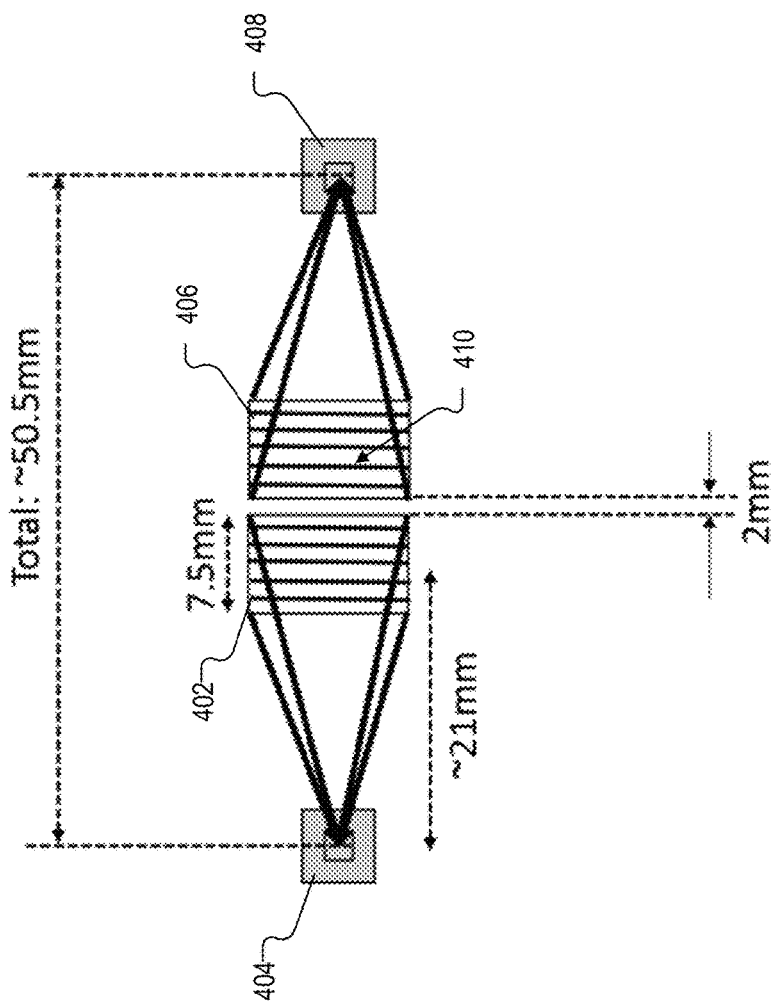
FIGS. 4A and 4B illustrate diagrams of front-views of a multi-directional waveguide eye tracking system, in accordance with aspects of the disclosure.
Figure 4B:
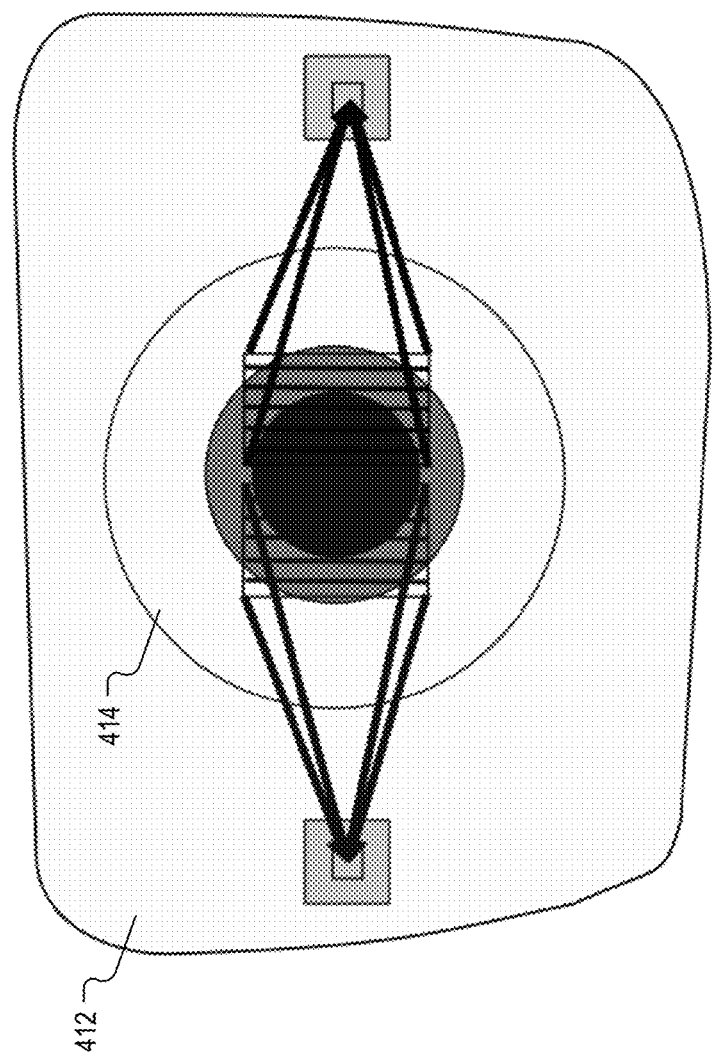

FIGS. 4A and 4B illustrate diagrams of front-views of multi-directional waveguide eye tracking system 400, in accordance with aspects of the disclosure. Waveguide eye tracking system 400 includes an input DOE 402, an image sensor 404, an input DOE 406, and an image sensor 408. Input DOE 402 and 406 may each have dimensions of 7.5 mm by 15 mm, for example. A gap between input DOE 402 and 406 may be approximately 2 mm, for example. A center to center distance between DOE 402 and image sensor 404 may be approximately 21 mm, for example, so that the image sensor to image sensor distance in a head mounted device is approximately 50.5 mm, according to an embodiment. Input DOE 402 and 406 may have grating planes 410 that are represented by vertical lines. FIG. 4B illustrates multi-directional waveguide eye tracking system 400 represented with a lens assembly 412 and in front of an eye 414 to illustrate how input DOE 402 and 406 may in-couple light from different portions of eye 414, according to an embodiment.

Figure 5:
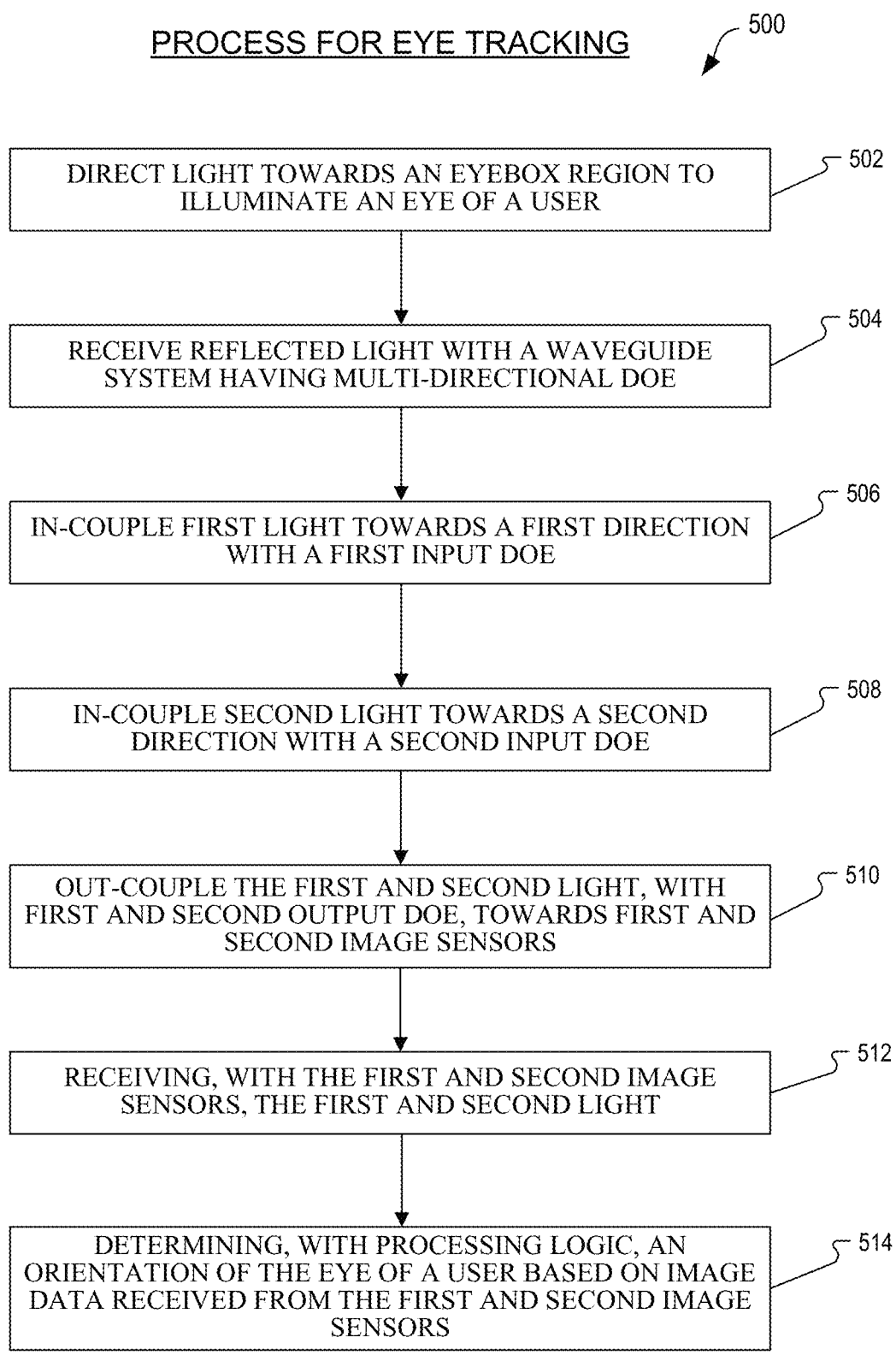
FIG. 5 illustrates a flow diagram of a process for eye tracking with a head mounted device, in accordance with aspects of the disclosure.

FIG. 5 illustrates a flow diagram of a process for eye tracking with a head mounted device, in accordance with aspects of the disclosure. Process 500 may be at least partially incorporated into or performed by a head mounted device (e.g., an HMD), according to an embodiment. The order in which some or all of the process blocks appear in process 500 should not be deemed limiting. Rather, one of ordinary skill in the art having the benefit of the present disclosure will understand that some of the process blocks may be executed in a variety of orders not illustrated, or even in parallel.

At process block 502, process 500 includes directing light towards an eyebox region to illuminate an eye of a user, according to an embodiment. Directing light may include selectively turning infrared light on/off to illuminate an eyebox region. Process block 502 proceeds to process block 504, according to an embodiment.

At process block 504, process 500 includes receiving reflected light with a waveguide system having multi-directional DOE, according to an embodiment. Process block 504 proceeds to process block 506, according to an embodiment.

At process block 506, process 500 includes in-coupling first light towards a first direction with a first input DOE, according to an embodiment. Process block 506 proceeds to process block 508, according to an embodiment.

At process block 508, process 500 includes in-coupling second light towards a second direction with a second input DOE, according to an embodiment. The first input DOE may be separated from the second DOE by a gap, so the combined area of the eyebox region from which light is in-coupled may be larger than the surface area of the first and second input DOE. Process block 508 proceeds to process block 510, according to an embodiment.

At process block 510, process 500 includes out-coupling the first and second light, with first and second output DOE, towards first and second image sensors, according to an embodiment. Process block 510 proceeds to process block 512, according to an embodiment.

At process block 512, process 500 includes receiving, with the first and second image sensors, the first and second light, according to an embodiment. Process block 512 proceeds to process block 514, according to an embodiment.

At process block 514, process 500 includes determining, with processing logic, an orientation of the eye of a user based on image data received from the first and second image sensors, according to an embodiment. Process 500 may also include providing control signals to the light sources and/or other actuators (e.g., a display) based on the estimated or determined orientation of the eye, according to an embodiment.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" (e.g., 120) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" (e.g., 122) described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A network may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels (e.g., 230) may include or be routed through one or more wired or wireless communication utilizing IEEE 802.11 protocols, short-range wireless protocols, SPI (Serial Peripheral Interface), I2C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A lens assembly for a head mounted device comprising:
a plurality of waveguide systems in a lens assembly, wherein the plurality of waveguide systems are configured to in-couple light from a plurality of portions of an eyebox region corresponding to a single user eye and are configured to couple the light from a center region of the lens assembly to a plurality of peripheral regions of the lens assembly; and
a plurality of image sensors optically coupled to the plurality of waveguide systems and configured to receive portions of the light,
wherein each of the plurality of waveguide systems includes an input diffractive optical element (DOE), wherein each input DOE is positioned so as to not overlap another input DOE of the plurality of waveguide systems.

2. The lens assembly of claim 1, wherein each input DOE is configured to in-couple the light from one of the plurality of portions of the eyebox region.

3. The lens assembly of claim 2, wherein each input DOE of each of the plurality of waveguide systems is separated by a gap from each other input DOE of the plurality of waveguide systems.

4. The lens assembly of claim 2, wherein the input DOE is a volume Bragg grating, switchable Bragg grating, or a holographic optical element.

5. The lens assembly of claim 1, wherein each of the plurality of waveguide systems are separated by a gap from each other of the plurality of waveguide systems.

6. The lens assembly of claim 1, wherein each of the plurality of portions of the eyebox region are separated by a gap from each other of the plurality of portions of the eyebox region.

7. The lens assembly of claim 1, wherein the plurality of waveguide systems are configured to in-couple the light from directly in front of the single user eye.

8. The lens assembly of claim 1, wherein each of the plurality of waveguide systems includes an output DOE configured to out-couple the light to one of the plurality of image sensors.

9. The lens assembly of claim 8, wherein a surface area of each output DOE is smaller than a surface area of an input DOE included in each of the plurality of waveguide systems.

10. The lens assembly of claim 1 further comprising:
a first waveguide layer that includes a first of the plurality of waveguide systems; and
a second waveguide layer coupled to the first waveguide layer, wherein the second waveguide layer includes a second of the plurality of waveguide systems.

11. A lens assembly for a head mounted device comprising:

a first waveguide configured to couple first light from a center region of a lens assembly to a first peripheral region of the lens assembly;

a first input diffractive optical element (DOE) disposed in the first waveguide and configured to in-couple the first light into the first waveguide from a first portion of an eyebox region corresponding to a single user eye;

a first image sensor optically coupled to the first waveguide and configured to receive the first light;

a second waveguide configured to couple second light from the center region of a lens assembly to a second peripheral region of the lens assembly;

a second input DOE disposed in the second waveguide and configured to in-couple the second light into the second waveguide from a second portion of the eyebox region, wherein the second input DOE does not overlap the first input DOE; and a second image sensor optically coupled to the second waveguide and configured to receive the second light.

12. The lens assembly of claim 11, wherein the first input DOE is separated by a first gap from the second input DOE, wherein the first portion of the eyebox region is separated by a second gap from the second portion of the eyebox region.

13. The lens assembly of claim 11, wherein the first input DOE and the second input DOE are configured to in-couple the first light and the second light from an area of the eyebox region that spans at least 17 mm by 15 mm.

14. The lens assembly of claim 11 further comprising:
a first waveguide layer that includes the first waveguide; and
a second waveguide layer that includes the second waveguide.

15. The lens assembly of claim 11, wherein the first waveguide and the second waveguide are a single waveguide that includes the first input DOE and the second input DOE, wherein the first input DOE is configured to couple the first light in a first direction in the single waveguide and the second input DOE is configured to couple the second light in a second direction in the single waveguide.

16. The lens assembly of claim 11, wherein the first and second input DOEs are configured to in-couple the first and second light from directly in front of the single user eye.

17. The lens assembly of claim 11 further comprising:
a first output DOE optically positioned between the first input DOE and the first image sensor to out-couple the first light to the first image sensor; and
a second output DOE optically positioned between the second input DOE and the second image sensor to out-couple the second light to the second image sensor.

18. A head mounted device comprising:
a frame; and
a lens assembly coupled to the frame and configured to transmit scene light to an eyebox region corresponding to a single user eye, wherein the lens assembly includes:
a plurality of waveguide systems in a lens assembly, wherein the plurality of waveguide systems are configured to in-couple light from a plurality of portions of the eyebox region and are configured to couple the light from a center region of the lens assembly to a plurality of peripheral regions of the lens assembly; and
a plurality of image sensors optically coupled to the plurality of waveguide systems and configured to receive portions of the light,
wherein each of the plurality of waveguide systems includes an input diffractive optical element (DOE), wherein each input DOE is positioned so as to not overlap another input DOE of the plurality of waveguide systems.

19. The head mounted device of claim 18 further comprising:
a plurality of light sources coupled to the frame and oriented to illuminate the eyebox region with the light; and
processing logic coupled to the plurality of image sensors and configured to determine an eye orientation based on image data from the plurality of image sensors.

20. The head mounted device of claim 19, wherein the processing logic is configured to generate control signals based on the eye orientation, wherein the control signals at least partially control the plurality of light sources.

* * * * *